United States Patent [19]

Thomas et al.

[11] 4,001,472
[45] Jan. 4, 1977

[54] NONWOVEN REINFORCED CELLULOSIC MATERIAL AND METHOD OF PREPARATION

[75] Inventors: Gordon D. Thomas; Jerome L. Schwoerer, both of Neenah, Wis.

[73] Assignee: Kimberly-Clark Corporation, Neenah, Wis.

[22] Filed: Feb. 25, 1974

[21] Appl. No.: 445,798

Related U.S. Application Data

[63] Continuation of Ser. No. 177,782, Sept. 3, 1971, abandoned, which is a continuation-in-part of Ser. No. 792,211, Jan. 13, 1969, abandoned.

[52] U.S. Cl. .............. 428/109; 15/209 R; 156/178; 156/179; 156/290; 428/110; 428/174; 428/182; 428/186; 428/198

[51] Int. Cl.² .......... B32B 5/10; B32B 5/12; B32B 5/14; B32B 29/02

[58] Field of Search .............. 161/133, 55, 59, 57, 161/58, 146, 148, 156, 128, 123, 124, 139; 15/209 R

[56] References Cited

UNITED STATES PATENTS

| | | | |
|---|---|---|---|
| 1,195,950 | 8/1916 | Carney | 161/133 |
| 3,025,199 | 3/1962 | Harwood | 161/57 |
| 3,042,278 | 7/1962 | McCullough | 161/133 |
| 3,072,511 | 1/1963 | Harwood | 161/57 |
| 3,404,748 | 10/1968 | Bjorksten | 161/133 |
| 3,518,142 | 6/1970 | Dooley | 161/133 |
| 3,546,056 | 12/1970 | Thomas | 161/57 |
| 3,611,919 | 10/1971 | Thomas | 161/57 |

FOREIGN PATENTS OR APPLICATIONS

| | | | |
|---|---|---|---|
| 284,740 | 8/1914 | Germany | 161/133 |

Primary Examiner—George F. Lesmes
Assistant Examiner—J. Cannon
Attorney, Agent, or Firm—Wolfe, Hubbard, Leydig, Voit & Osann, Ltd.

[57] ABSTRACT

In a process for forming a nonwoven reinforced cellulosic material, for use in applications such as wipes and disposable clothing, which comprises applying adhesive to a ply of nonwoven scrim, bringing at least one cellulosic ply into contact with the scrim to form a substantially unbonded laminate, the improvement comprising applying pressure to discrete regions of said substantially unbonded laminate while said adhesive is in an activated condition. The application of pressure to discrete regions achieves ply attachment at only intermittent points on the scrim and can also serve to provide an embossed laminate texture. The product so formed is strong and has desirable absorbency, texture, bulk, hand and limpness.

6 Claims, 6 Drawing Figures

NONWOVEN REINFORCED CELLULOSIC MATERIAL AND METHOD OF PREPARATION

RELATED APPLICATIONS

The present application is a continuation of Ser. No. 177,782, filed Sept. 3, 1971, and now abandoned, which in turn was a continuation-in-part of application Ser. No. 792,211, filed Jan. 13, 1969, for Process for Forming Nonwoven Reinforced Cellulosic Material, which latter application is now abandoned.

DESCRIPTION OF THE INVENTION

This invention relates to cellulosic materials and, more particularly, to nonwoven scrim reinforced cellulosic materials characterized by desirable properties with respect to absorbency, texture, bulk, hand and limpness.

It is known in the art to prepare a reinforced cellulosic material by first forming a scrim comprising a set of spaced warp threads, which extend in the longitudinal or machine direction, and a set of fill threads, which extend across the warp threads in a transverse direction. Since the fabric is nonwoven, the fill threads are all on the same side of the warp threads. The two sets of threads are disposed in a face-to-face relation to each other and adhesively bonded together where the threads of one set cross the threads of the other set. Nonwoven fabrics of this type may be made by any of several different known methods and apparatus, one example of which is described in U.S. Pat. No. 2,841,202 to H. W. Hirschy.

As shown in Hirschy et al. U.S. Pat. No. 2,902,395 and Harwood U.S. Pat. 3,025,199 these nonwoven fabrics can then be bonded to one or more layers of cellulosic material to form a laminate that may be utilized for a variety of uses such as, for example, facial and other wipes, towelling and disposable clothing. While such materials may be advantageously employed for these uses, when ply attachment is achieved over the whole surface area of the scrim, the products are relatively dense and flat. In order to present a product with an acceptable bulk and absorbency, it is generally necessary to use high basis weight amounts of cellulosic material and/or to subject the product to bulking techniques such as creping or embossing or swing tentering as shown in the aforementioned Harwood patent. The first of these alternatives increases product expense. The effectiveness of the latter is limited by the fact that when the cellulosic material is bonded to a large portion of the scrim surface area the capacity of the cellulosic material to bulk extensively without rupture is limited.

It is accordingly a principal object of the present invention to provide a bonded nonwoven scrim reinforced cellulosic material and a process for preparing such in which bonding is accomplished in a manner so as to efficiently utilize the cellulosic material for its intended function of providing product bulk and absorbency.

Closely related to the principal object is the further object of providing materials with desirable bulk and absorbency with only small quantities of cellulosic material.

An additional object resides in providing extendable scrim-reinforced cellulosic materials having the aforementioned attributes.

A further object of the present invention is to provide a process for forming a scrim reinforced cellulosic material of the above-described type wherein a desirable bulky texture can be achieved concomitant with bonding thus obviating the necessity for subsequent product bulking procedures.

A still further object is to provide a nonwoven scrim reinforced material wherein the material exhibits a desirable response to subsequent bulking techniques where further enhancement of bulk and/or absorbency is desired.

Other objects and advantages will become apparent as the following description proceeds, taken in conjunction with the accompanying drawings, in which.

Figure 1:
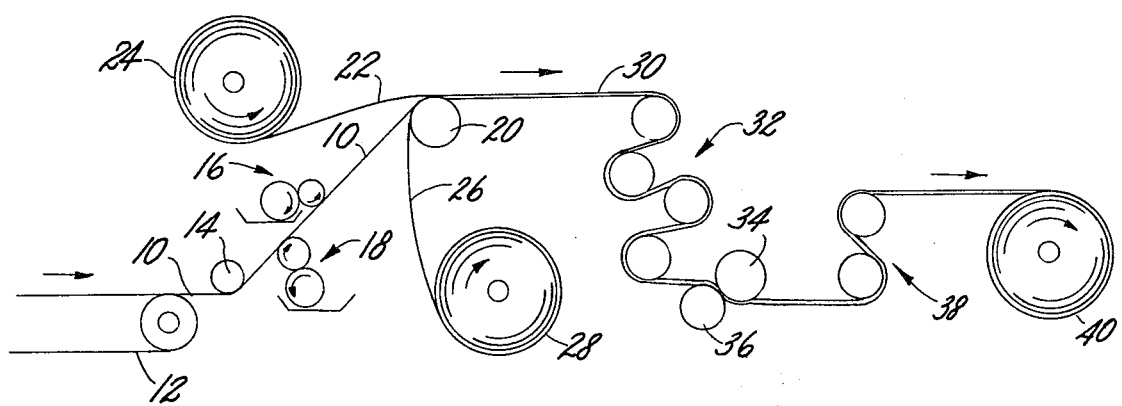
FIG. 1 is a schematic view and illustrating an exemplary method of preparing materials of the present invention.

While the invention is susceptible of various modifications and alternative forms, certain specific embodiments thereof have been shown by way of example in the drawings which will be described in detail herein. It should be understood, however, that is is not intended to limit the invention to the particular forms disclosed, but, on the contrary, the intention is to cover all modifications, equivalents and alternatives falling within the spirit and scope of the invention.

Referring now more particularly to the accompanying drawings, a manner of preparing products having the desirable characteristics set forth in the previous objects is illustrated in FIG. 1. The nonwoven scrim material, therein designated by the numeral 10, is formed by any of the several different known methods and apparatus, one example of which is described in the aforementioned Hirschy patent. The warp and fill threads can be adhesively bonded together to form the scrim by any conventional means. The scrim employed can have from 1 to 12 or more threads/in. in each direction. Any conventionally employed material such as nylon, rayon or polyester can be employed for the scrim. The denier can generally be in the range of from 20 to 150.

In the illustrated embodiment of FIG. 1, the scrim 10 is transported by the endless belt 12 past the turning roll 14 and adhesive applied to both the fill and warp threads thereof by applicator rolls 16 and 18. The adhesively-coated scrim is then passed around a roll 20 and the unbonded laminate 30 is formed by locating the scrim between a layer of cellulosic wadding 22 from a roll 24 and a cellulosic wadding layer 26 from a roll 28. The cellulosic wadding can be any of the conventionally known types and can comprise one or more plies. When more than two plies are used, the individual plies are preferably independently interbonded by adhesive applied to a sufficient area of adjacent surfaces of the multiple plies to hold the plies together. As will be apparent to those skilled in the art, the adhesive will normally be applied in a discontinuous pattern so that the desired interbonding is achieved with a minimum of adhesive and without decreasing the flexibility of the multi-ply layer. The drier basis weight per ply will normally be between 4 and 13 lbs./2880 sq. ft. The cellulosic wadding should generally contain stretch in the 10 to 150% range.

To activate the adhesive in the FIG. 1 embodiment, there are provided a series of heated rolls. Thus, the unbonded laminate 30 is passed around a series of rolls 32, heated to a temperature in the range of from about 200° to about 350° F., depending upon the adhesive that is applied by applicator rolls 16 and 18. When the adhesive used is a plastisol, such as a vinyl chloride polymer or a copolymer of vinyl chloride with another vinyl resin dispersed in a plasticizer such as an organic phthalate, sebacate or adipate, the temperatures employed will be at the higher part of the range. With a solvent-based adhesive such as polyvinyl acetate in acetone, or a water-based adhesive such as a latex emulsion, activation of the adhesive and the subsequent bonding can be achieved at temperatures in the range of 200° to 220° F. or lower.

An important feature concerning adhesive activation is that the adhesive be in a condition whereby under pressure secure ply attachment can be achieved. In turn, such attachment depends on the adhesive being sufficiently fluid so as to be able to penetrate into the cellulosic layers with the application of pressure. It should be noted that merely bringing the various plies into contact without an accompanying application of pressure does not result in a functionally useful degree of ply attachment since no significant adhesive penetration into the cellulosic layers occurs. Thus, as the term is used herein, "ply attachment" requires adhesive penetration into the cellulosic layer such as can be achieved by means of pressure applications.

Furthermore, the adhesive must be capable of developing sufficient strength to assure secure laminate formation between the scrim and cellulosic layer at the points of ply attachment on cooling. While preferably, at the time of pressure application, the adhesive is in a condition whereby on cooling sufficient strength is present, subsequent heating after pressure application can be employed if necessary.

Conventionally, the final heated roll forms a pressure nip with a calender roll to achieve adhesive penetration and bond the nonwoven material to the cellulosic material to form a bonded laminate. However, in accordance with that embodiment of the present invention depicted in FIG. 1, the final heated, smooth roll is replaced by a heated, engraved roll. The engraved roll has raised elements on its surface which, as hereinafter discussed, function to apply localized pressure to the laminate to achieve ply attachment between the scrim and cellulosic layer at only intermittent points on the scrim surface. Thus, as shown, the unbonded laminate 30 is bonded by being passed through the nip formed by a heated engraved roll 34 operating against a silicone rubber, smooth calender roll 36. This accomplishes penetration of the adhesive on the scrim into the cellulosic layers in those discrete regions corresponding to the engraved roll pattern. The so bonded laminate is then cooled by passage around rolls 38 and may be conventionally wound up on roll 40.

The scrim reinforced cellulosic material prepared in the manner described with respect to FIG. 1 has a desirable hand and limpness. Furthermore, the intermittent points of attachment between the scrim and cellulosic layers are located only in those compressed regions where due to the raised elements on the engraved roll pressure has been exerted to effect adhesive penetration. The product is also characterized by an embossed surface texture corresponding to the engraved roll pattern wherein the bulk of the cellulosic layers has been accentuated in those distinct areas between the compressed regions. In addition, when a heated engraved roll is employed in combination with a thermoplastic scrim material, the scrim will be heat set in a non-planar position with the resulting laminate exhibiting a corresponding desirable yieldability, the degree and direction of which depends on the pattern of raised elements on the engraved roll surfaces. Also, such heat setting contributes to the products ability to hold the embossed configuration.

In addition to the above-mentioned desirable attributes, preparing the laminate in the illustrated fashion is also accompanied by other advantages compared with conventional techniques of preparation involving overall calendering. These include (a) the ability to obtain a higher level of embossment thus obtaining greater accentuation of product bulk without having to use additional quantities of material and (b) enhanced absorbency characteristics.

Turning initially to that feature concerning the ability to be more highly embossed, the applicability is twofold. First of all, since initial embossing of the laminate is effected before any significant degree of ply attachment has been achieved, the individual plies of the laminate, and particularly the cellulosic layers, are free to assume the pattern of the engraved roll without an undue amount of restraint which could result in rupture. Thus, as opposed to laminates wherein the cellulosic layers are secured to the reinforcing scrim prior to embossing, the present technique permits a higher degree of embossing for an equivalent amount of material and, accordingly, the attainment of more bulk.

Additionally, laminates prepared as described herein can be further embossed after their initial preparation to greater accentuate their bulk and absorbency. The fact that such can be accomplished without accompanying adverse effects is believed to be attributable to the afore-mentioned yieldability of the product which can be built in during its preparation and the fact that ply attachment between the cellulosic layer and the scrim occurs only at discrete intermittent points on the scrim surface. Both of these factors enhance the capacity of the cellulosic layer to yield without rupture when subjected to deformation such as accompanies embossing or other bulk enhancing techniques such as microcreping or the like.

Regarding absorbency, products prepared as illustrated herein exhibit, for a given quantity of cellulosic material, a surprisingly improved capacity for holding fluid and fluid absorption rate compared with conventional scrim reinforced products. While such improvement is in part attributable to the fact that the products can be fashioned with greater bulk, the only intermittent nature of ply attachment is also believed to contribute to the noted improvement. By means of such attachment, fluid can readily penetrate and wick between the portions of the cellulosic layers positioned adjacent to the open areas of the scrim, i.e., the scrim windows. In contrast, with conventionally prepared products wherein overall attachment between the scrim and cellulosic layer is effected by calendering, the portions of the cellulosic layer adjacent the scrim windows are isolated from one another by being attached to the scrim, with substantially no unobstructed fluid transmitting channels being present.

Figure 2:
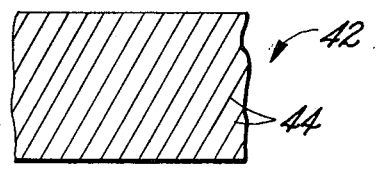
FIG. 2 is a schematic view illustrating a portion of a roll that may be employed in the process.
Figure 5:
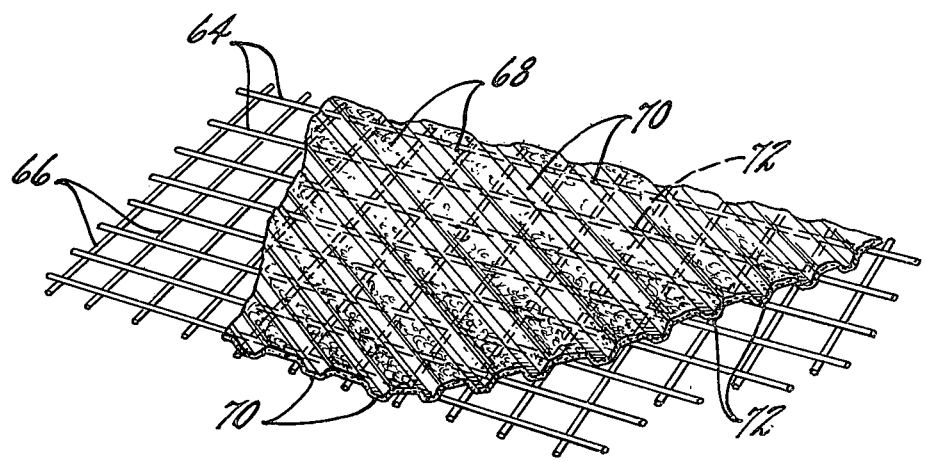
FIG. 5 is a fragmentary perspective view of a material constructed in accordance with an embodiment of the present invention.

FIG. 5 vividly illustrates several of the desirable characteristics of products prepared in accordance with the present invention. As is evident, the product depicted in this embodiment contains a scrim containing threads 64 and 66 and, for purposes of illustration, a single layer of cellulosic wadding. As illustrated, the wadding contains an embossed texture having compressed regions 70 adjacent to and extending across both scrim threads and windows. The wadding bulk is accentuated in those distinct uncompressed areas 68 between the compressed regions 70. Preparation of the illustrated product can be accomplished by using a single ribbed roll such as illustrated in FIG. 2 having a series of spaced, elevated ribs 44 in combination with a smooth surfaced back up roll. Wadding is bonded to the scrim only at those intermittent points 72 within the compressed regions 70 where a scrim thread contacts the wadding thus resulting in the presence of substantial fluid transmitting channels throughout the wadding which are not blocked or obstructed by adhesive.

Figure 6:
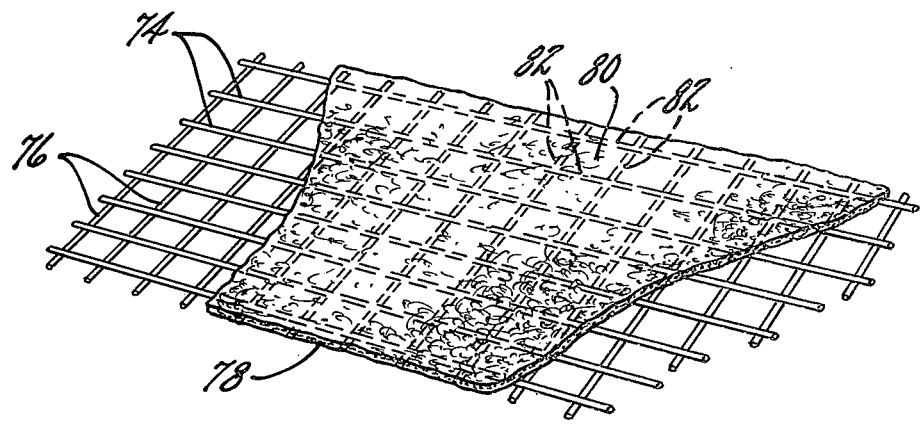
FIG. 6 is a fragmentary perspective view of a conventionally prepared material.

In contrast, FIG. 6 illustrates a conventionally prepared product again containing a nonwoven scrim formed from threads 74 and 76 and a layer of cellulosic wadding 78. Ply attachment between the scrim and wadding is effected at all points where the wadding contacts the scrim. Accordingly, wadding in a region such as 80 which is adjacent a scrim window such as that defined by the scrim lines 82 is effectively sealed from other portions of the wadding adjacent the contiguous scrim windows thus restricting fluid wicking and the like.

In keeping with the present invention is should be understood that the embossing effect referred to above to achieve ply attachment can be accomplished by any of serveral means. In addition to the above-illustrated use of a silicone rubber calender roll, an engraved roll could also be operated against a paper filled calender roll to achieve the indicated spot attachment only at the points of contact between both rolls where a scrim thread is present.

Figure 3:
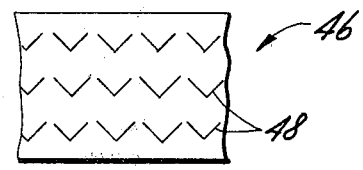
FIG. 3 illustrates an alternative roller that may also be utilized.

The pattern of the engraved roll is not restricted to any specific design and the particular design selected can be varied to provide any textured surface that may be desirable. For example, FIG. 3 illustrates schematically rolls 46 having a pattern of V-shaped raised elements 48. The important features are that only intermittent attachment at discrete points on the scrim be effected and that sufficient attachment be achieved throughout the scrim to provide adequate ply attachment. Thus, engraved rolls with raised elements having dimensions such that a scrim thread in the cross or fill direction is attached to the cellulosic layer at at least one point, and preferably at least two points, between adjacent warp threads can be desirably employed. In addition, the dimensions of the raised elements should be such so as to result in about 20%–70%, and preferably 30%–50%, of the scrim area being attached to the cellulosic layer. Also, an endless patterned fabric belt could be introduced into the nip formed by the conventionally employed calender roll and the heated smooth roll.

In addition to the above-described embodiments, an engraved roll could be employed to form female impressions in a paper filled calender roll and the two rolls then employed as a set of matched rolls. While such an arrangement would probably effect a degree of overall ply attachment, the advantage referred to previously of having the plies unattached during initial embossment thereby permitting the attainment of increased bulk would be achievable. A similar effect can be achieved with a smooth silicone rubber roll if the surface is sufficiently soft.

In accordance with a further embodiment of the present invention, embossing can be carried out by employing a pair of ribbed rolls that will allow high speed operation. To this end, and as shown in FIG. 2, a pair of rolls 42 having a series of spaced, elevated ribs 44 can be utilized. In use, the ribbed rolls are rotated in the same direction and cross each other to form a diamond pattern on the scrim-reinforced material. Higher speeds of operation can be achieved, there being no necessity that the embossing land areas mesh with those of a companion roll. Typical rolls could have ribs with a height of about 0.07 inch, a width of about 0.03 inch and separated from adjacent ribs by about 0.07 inch. When such a ribbed construction is used, bonding of the tissue layers to the scrim occurs only in the small areas where the ribs cross on a scrim thread. The major portion of the tissue layers is not calendered or compressed and the initial tissue properties are retained to a significant degree.

Figure 4:
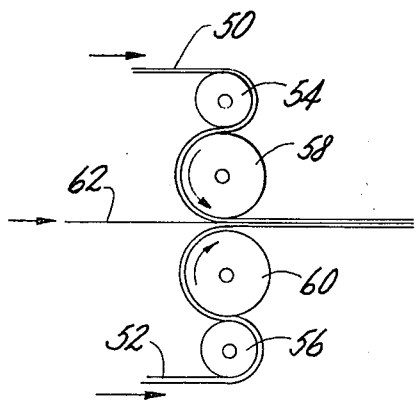
FIG. 4 is a schematic view illustrating a further exemplary method of providing a scrim reinforced material.

In accordance with still another feature of the present invention, a scrim-reinforced material can be formed in a manner wherein the cellulosic layer is pre-embossed and then brought into contact with the scrim material so as to achieve intermittent attachment. Thus, as is schematically illustrated in FIG. 4, a pair of cellulosic layers 50 and 52 are passed around silicone rubber rollers 54 and 56, respectively, and through the nip formed between these rollers and the ribbed rolls 58 and 60. This serves to emboss the cellulosic layers in the configuration of the ribbed rolls. Thereafter, a scrim 62, coated with adhesive (such as is shown in FIG. 1), is positioned to pass between the two cellulosic layers as they travel through the nip formed between the ribbed rolls 58 and 60. In the roll 58 and 60 nip pressure is applied to the composite and accordingly attachment to the scrim is achieved only at those small areas where the ribs cross on a scrim thread. Moreover, the initial embosed texture of the cellulosic layers is not adversely affected on passage through the bonding nip.

We claim as our invention:

1. A soft, limp nonwoven scrim reinforced cellulosic product comprising a cellulosic layer adjacent to and in laminar relationship with a scrim material having crossed sets of threads with open windows therebetween, said cellulosic layer having a pattern of spaced compressed regions disposed adajcent to and extending across both scrim threads and windows with ply attachment between said scrim and cellulosic material being effected by adhesive at only intermittent points on the surface of said scrim material disposed adjacent compressed regions of the cellulosic layer, said cellulosic layer between said compressed regions being in its uncompressed state to provide fluid transmitting channels adjacent to and extending across both the scrim threads and windows, and to provide bulk, an embossed surface texture, and enhanced absorbency hand and limpness.

2. The soft, nonwoven scrim reinforced cellulosic product of claim 1 wherein the cellulosic layer is cellulosic wadding.

3. The soft, nonwoven scrim reinforced cellulosic product of claim 2 wherein at least one ply of cellulosic wadding is disposed on either side of the scrim material.

4. The soft, nonwoven scrim reinforced cellulosic product of claim 1 wherein the scrim is heat set in a non-planar position to provide product yieldability.

5. The soft, nonwoven scrim reinforced cellulosic product of claim 4 wherein the cellulosic layer is cellulosic wadding.

6. The soft, nonwoven scrim reinforced cellulosic product of claim 5 wherein at least one ply of cellulosic wadding is disposed on either side of the scrim material.

* * * * *